W. D. WILCOX.
METHOD OF MANUFACTURING GAS.
APPLICATION FILED APR. 1, 1918.

1,372,731.

Patented Mar. 29, 1921.
4 SHEETS—SHEET 1.

Witness
Hulton Lenoir

Inventor
William D. Wilcox,
by Adams & Jackson.
Attorneys

W. D. WILCOX.
METHOD OF MANUFACTURING GAS.
APPLICATION FILED APR. 1, 1918.
1,372,731.
Patented Mar. 29, 1921.
4 SHEETS—SHEET 2.
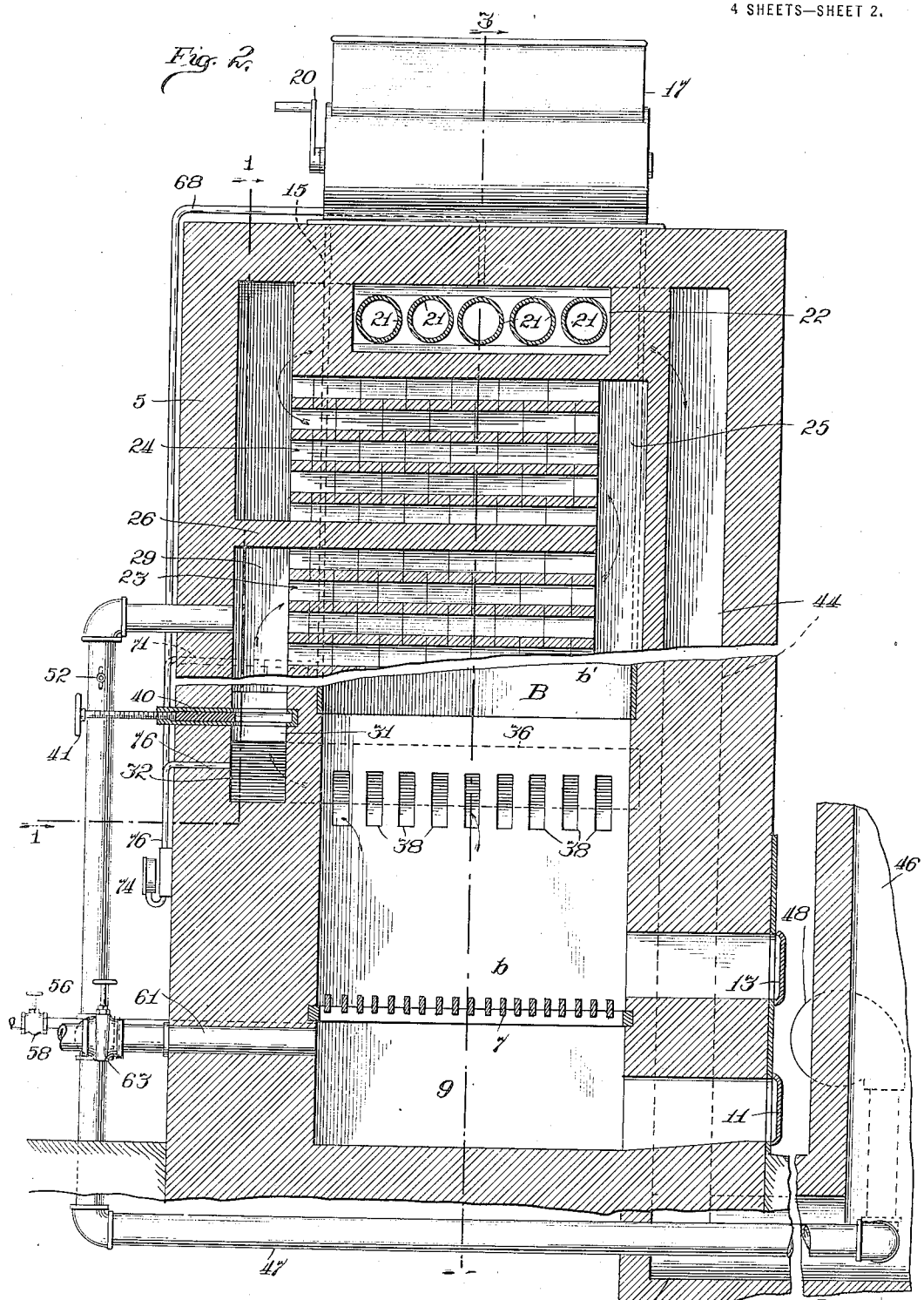

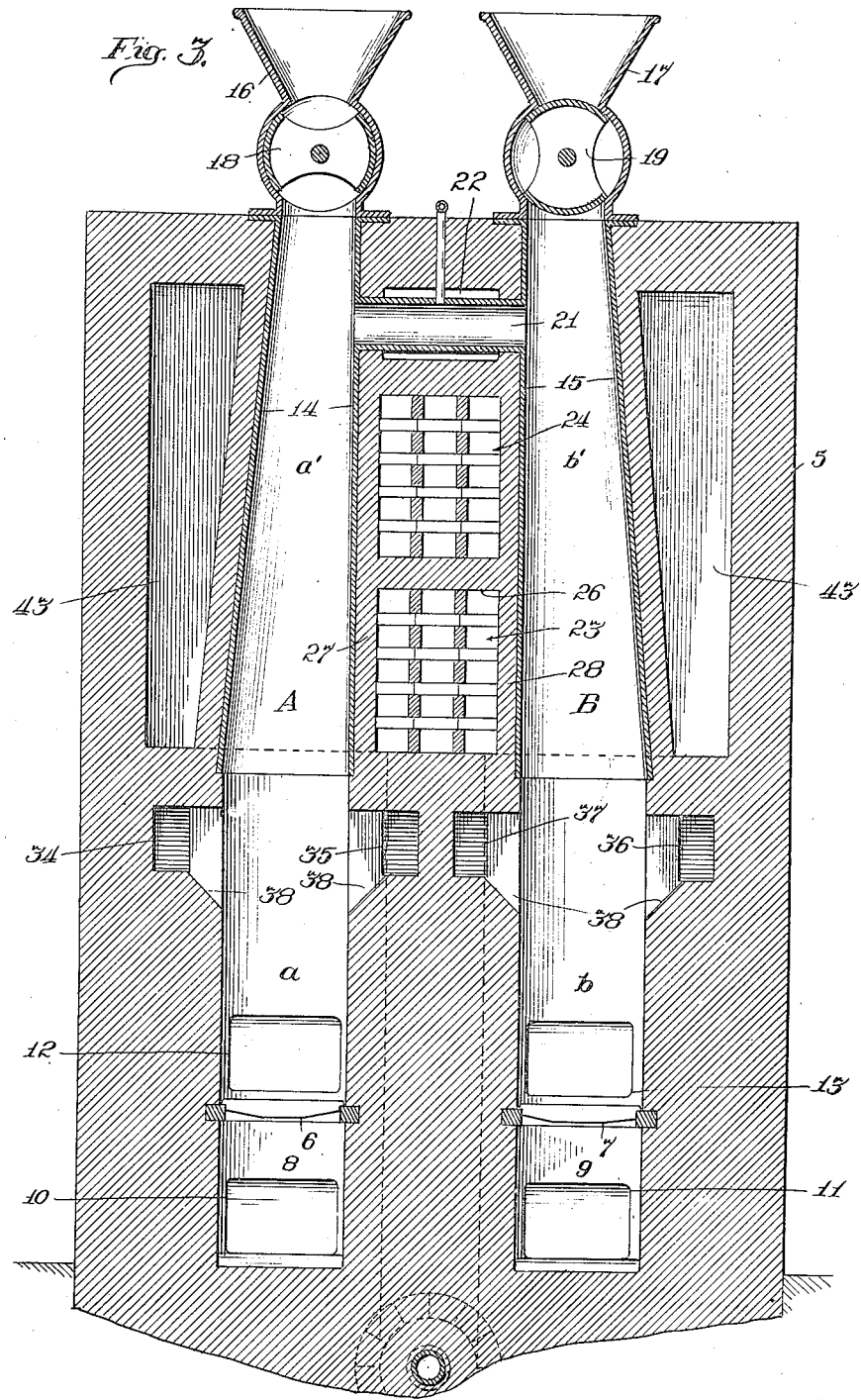

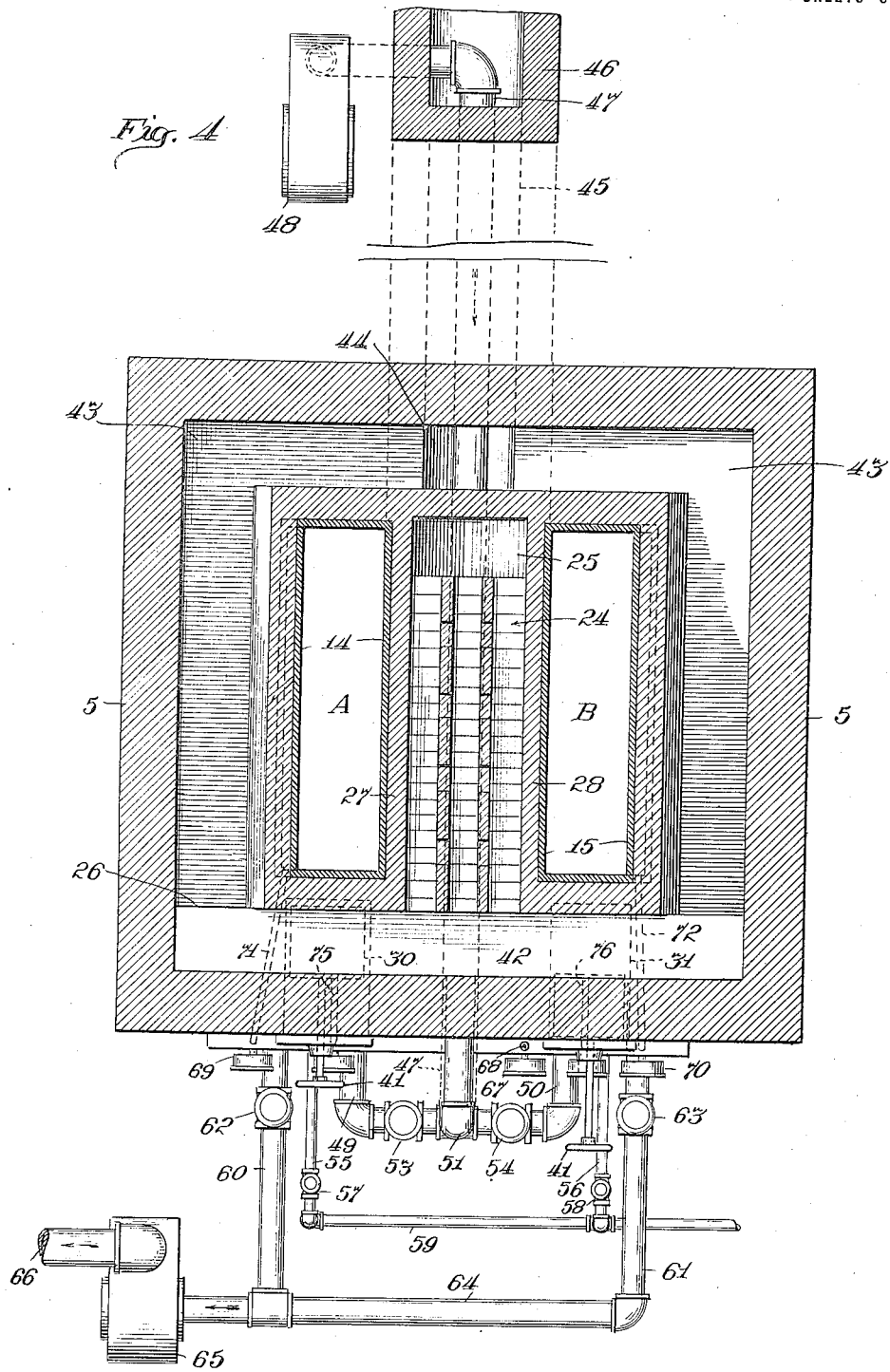

UNITED STATES PATENT OFFICE.

WILLIAM D. WILCOX, OF CHICAGO, ILLINOIS.

METHOD OF MANUFACTURING GAS.

1,372,731.     Specification of Letters Patent.     Patented Mar. 29, 1921.

Application filed April 1, 1918. Serial No. 225,965.

*To all whom it may concern:*

Be it known that I, WILLIAM D. WILCOX, a citizen of the United States, and a resident of Chicago, in the county of Cook and State of Illinois, have invented a certain new and useful Method of Manufacturing Gas, of which the following is a specification, reference being had to the accompanying drawings.

My invention relates to the manufacture of gas for domestic and other uses, and has for its object to provide an efficient method by which gas may economically be produced from sub-bituminous coal, lignite, wood, air-dried peat, etc. Fuels of the high moisture, high oxygen type, such as those above indicated, can not be advantageously used to produce gas in externally heated retorts of the sort usually employed in carbonizing coal, owing largely to the excessive cost of the treatment necessary to recover the condensable matter distilled off with the gas and of the purification processes which it is necessary to employ. For example, the large amount of moisture contained in the fuel must necessarily be turned into steam and the steam must later be condensed out, requiring the provision of larger condenser capacity and an ample supply of cooling water, and the volume of condensate from the gas is so great that the cost of recovering ammonia from the liquor is necessarily excessive. Also the percentage of carbon dioxid given off is proportionately very great, and the cost of removing it by purification is frequently prohibitive. These and other objections which might be mentioned make it impracticable to employ the fuels mentioned in the production of gas by the use of externally heated coal gas retorts, and so far as I am aware there has heretofore been no practical method or apparatus by which such fuels could be advantageously employed in the manufacture of gas for domestic and similar uses.

The invention which forms the subject matter of this application comprises a new and improved method of treating fuels of the high moisture, high oxygen type, by which the objections above pointed out are avoided, and it is made entirely practicable and profitable to manufacture gas from such fuels, even in relatively small plants. My invention possesses the further advantage that it is applicable to the production of gas from coal of the various kinds commonly used in different parts of the country. The nature and characteristic features of my improved process will be more readily understood and appreciated if considered in connection with the apparatus which I have devised for practising such method, and I shall, therefore, proceed with the description of such apparatus, referring to the accompanying drawings in which I have illustrated one form of apparatus for which my invention may be practised.

In the drawings:—

Fig. 2 is a vertical sectional view on line 2—2 of Fig. 1;

Fig. 3 is a vertical sectional view on line 3—3 of Fig. 2, and

Fig. 4 is a horizontal sectional view on line 4—4 of Fig. 1.

Figure 1:
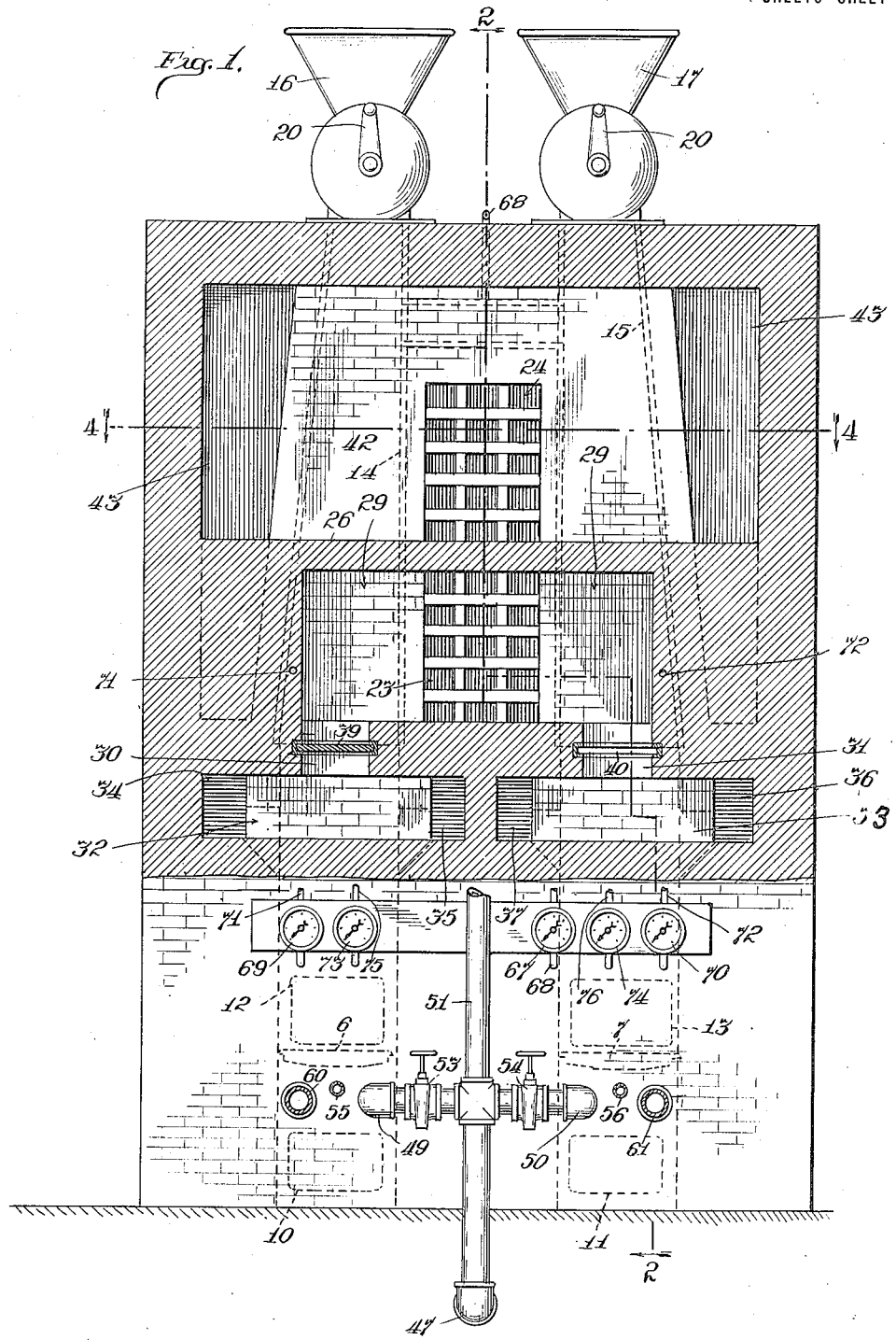
Figure 1 is a front view, the upper portion of the front wall being cut away substantially on line 1—1 of Fig. 2.

Referring to the drawings, it will be noted that the apparatus illustrated comprises a pair of similar vertically-disposed retort generators A—B set in juxtaposition to each other within the confines of an external wall 5 (see Figs. 3 and 4). These retort generators, the retort portions of which, as shown in Fig. 4, are made rectangular in cross-section, are similar to retort generators heretofore known in that they each comprise a generator or generator chamber at the bottom, indicated in the drawings by $a$—$b$, respectively, and retorts $a'$—$b'$ at the top, grates 6—7 being provided in the lower portions of the generators A—B, respectively, below which are ash-pits 8—9, to which access may be had through doors 10—11, respectively, as shown in Figs. 2 and 3. Similar doors 12—13 afford access to the generator chambers above the grates 6—7 for the purpose of removing clinkers, etc. It will be noted from an inspection of Fig. 3 that the retorts $a'$—$b'$ are somewhat elongated vertically and taper outwardly from the top downward to their respective generator chambers, thus facilitating and promoting the downward movement of the fuel in them. The inner or adjacent walls of the two retorts are preferably substantially vertical, as shown in Fig. 3. The retorts $a'$—$b'$ are lined with suitable gas-tight linings 14—15 of steel or other suitable material capable of resisting the temperature to which it is subjected under operating conditions. 16—17 indicate hoppers communicating respectively with the retorts $a'$—$b'$ and preferably provided with valves 18—19 of any suitable type by which charges of fuel may be introduced from time to time as required. The valves 18—19 illustrated in the drawings are of the rotary type provided with a crank 20 for operating them, as shown in Fig. 2, but any other suitable type of valve or hopper may be employed. It is, of course, necessary that the construction be such as to normally prevent the escape of gases through the fuel inlet openings.

21 indicates a cross connection between the upper portions of the two retorts $a'$—$b'$, as shown in Fig. 3. This cross connection may be in the form of a single transverse passage of suitable dimensions, but preferably I employ a plurality of pipes arranged side by side in a transverse chamber 22, as more clearly shown in Fig. 2. The purpose of this communicating passage between the upper portions of the two retorts will be explained later.

23—24 indicate two combustion chambers which are disposed between the retorts $a'$—$b'$, as shown in Fig. 3, and communicate with each other at one end by a vertical passage 25, as shown in Figs. 2 and 4, said chambers being otherwise separated by a horizontal partition 26 shown in Figs. 2 and 3. Said chambers contain checker brick, as shown in the drawings, and are provided with side walls 27—28 of refractory material which separate them from the retorts. The end of the chamber 23 farthest from the vertical passage 25 opens into a transverse chamber 29 back of the front wall 5 of the apparatus, and the latter chamber communicates through passages 30—31 with transversely-extending passages 32—33, respectively, as best shown in Fig. 2. The latter passages communicate by fore and aft flues or channels with the interior of the generator chambers $a$—$b$, respectively, at opposite sides thereof. The flues or channels which communicate with the transverse passage 32 are shown at 34—35 in Fig. 3, and the corresponding flues which communicate with the passages 33 are shown at 36—37 in the same figure. These several flues are in the nature of channels formed in the opposite walls which form the generator chambers, a series of slits 38 being provided at intervals, as shown in Figs. 2 and 3, to permit the free flow of gases from the generator chambers to said channels. 39—40 indicate suitable valves in the passages 30—31, respectively, said valves being preferably gate valves operated by hand wheels 41, as shown in Fig. 2. 42 indicates a transverse chamber back of the front wall of the apparatus, the part over the chamber 29 being separated therefrom by the horizontal partition 26, as shown in Figs. 1 and 2. This chamber communicates with the upper combustion chamber 24 which opens into it, as shown in Fig. 2. The chambers 23—24 thus constitute sections of a tortuous combustion chamber interposed between the transverse chambers 29 and 42. 43 indicates an outer heating chamber which extends around three sides of the central portion of the apparatus, which includes the two retorts and the combustion chambers between them, as illustrated in Fig. 4, and communicates with the transverse chamber 42, which really constitutes a part of said outer heating chamber, although it does not extend down the full depth thereof, being stopped by the horizontal partition 26. 44 indicates a vertical flue which communicates with the back portion of the heating chamber 43 and extends down to a horizontal flue 45 which leads to a stack 46, as shown in Figs. 2 and 4.

It will be apparent from the foregoing description that if, for example, the valve 40 is open and the valve 39 is closed, as shown in Figs. 1 and 2, gases from the generator $b$ may flow through the channels 36—37 to the transverse passage 33, and thence up through the passage 31 to the transverse chamber 29 and that they may then flow through the lower combustion chamber 23 to the vertical passage 25, and passing up through said passage, may then flow in the opposite direction through the upper combustion chamber 24 to the transverse chamber 42. Upon reaching this chamber, they will be free to flow through the outer heating chamber 43 around the outer sides of the retorts $a'$—$b'$ to the vertical flue 44 through which they may pass downward to the flue 45 which discharges them into the stack 46. Under the conditions recited, the valve 39 being closed, gases from the generator $a$ would not be permitted to pass to the combustion chamber 23, and consequently they would be compelled to pass up through the retort $a'$. A reversal of the valves 39—40 would, of course, reverse the situation as regards the flow of gases from the two generators.

47 indicates an air supply pipe through which fresh hot air is supplied to the ash-pits 8—9 and also to the chamber 29. Said pipe extends for a part of its length through the duct 45 so that the air in said pipe is heated by the waste gases passing through said duct to the stack 46. A blower 48 is connected with said pipe for forcing air in the direction indicated by the arrow in Fig. 2. 49—50 indicate branch pipes leading from the pipe 47 to the ash-pits 8—9, respectively, as shown in Figs. 1 and 4. 51 indicates a pipe which forms a continuation upward of the pipe 47 and discharges into the chamber 29, as shown in Fig. 2. The latter pipe is provided with a valve 52 for controlling the supply of secondary air to said chamber. 53—54 indicate valves for controlling the admission of air through the pipes 49—50, respectively, as shown in Fig. 1. 55—56 indicate steam pipes for the admission of steam to the ash-pits 8—9, said pipes being provided with valves 57—58, respectively, as shown in Fig. 4. 59 indicates a steam supply pipe which connects with the pipes 55—56 and receives steam from any suitable source, such as a boiler. 60—61 indicate gas outlet pipes, which communicate respectively with the ash-pits 8—9, as shown in Fig. 4, and are provided with valves 62—63, respectively. Said pipes connect with a main 64 having connected with it an exhaust fan 65 for drawing gases out through said ash-pits to the main 64. 66 indicates a discharge pipe leading from the fan 65, as shown in Fig. 4. 67 indicates a gage for indicating the pressure in the cross-connection conduit 21, said gage being connected therewith by a pipe 68, as shown in Fig. 2. 69—70 indicate gages connected with the lower portions of the retorts $a'$—$b'$ through pipes 71—72, respectively, shown in Figs. 1 and 2, and 73—74 indicate gages connected by pipes 75—76 with the passages 32—33, respectively. The purpose of these gages is to indicate the pressure in the several passages or chambers with which they are respectively connected.

The operation is as follows: When operations are resumed following a shut down, the two connected retorts $a'$—$b'$ will be filled with material partially coked as the result of the previous operation and the generator chambers $a$—$b$ will be filled with the fixed carbon residue from a previously completed distillation. Assuming this to be the situation, as the first step, air under pressure will be admitted to the ash-pits 8—9 under both generator chambers, by opening the valves 53—54, to promote combustion therein. Both valves 39—40 leading to the chamber 29 and through it to the combustion chamber sections 23—24, will at this time be open, and consequently the blast gases from both generator chambers will pass into the chamber 29 where they will receive a supply of secondary air through the pipe 51, the valve 52 being then open. The blast gases will, therefore, be consumed in the combustion chamber sections, heating the walls and brick in said chambers and finally passing out into the chamber 42 and the outer chamber 43 which surrounds the retorts $a'$—$b'$. The cooler portion of the combustion products will normally sink to the bottom of the chamber 43, and as hot waste gases continue to pass into the upper portion of said chamber, the cooler gases will be forced out through the ducts 44 and 45 to the stack 46. During this period of blasting, the coke in the generator chambers, and the surrounding walls will be heated to a high degree of incandescence. The combustion chamber, considered as a whole, and the walls of the retorts $a'$—$b'$ will also be highly heated, and a portion of their heat will be transmitted to the material in said retorts. When the materials in the generator chambers reach the desired state of incandescence, the air is shut off from both generator chambers, and steam under boiler pressure is admitted below the grates of both generators, for the purpose of purging the generator chambers of the products of combustion. Following this, the gate valves 39—40 are closed, the supply of steam to one or the other generator chamber, $b$ for example, is shut off, and the valve of the corresponding gas outlet pipe, the valve 63 in this instance, is opened. Steam now passes under boiler pressure up through generator chamber $a$, in which a part of it, at least, is converted into water gas, up through the material in the retort $a'$, through the connecting passage 21 into the upper portion of the retort $b'$, down through the material in the latter retort and through the incandescent coke in the generator chamber $b$, and out through the gas outlet pipe 61 to the main 64. The described flow of the gas is promoted and regulated by the partial vacuum created by the pull of the exhaust fan 65. The passage of the gas through the retorts, as described, imparts to the materials therein any sensible heat which it may have in excess of the sensible heat of the materials in the retorts, thereby assisting in heating such materials and in driving off their content of volatiles. The resulting admixture comprising water gas, undecomposed steam, carbon dioxid, tarry vapor, and hydro-carbon gas, passes downward through the incandescent coke in the generator chamber $b$. Assuming the requisite temperature, the water vapor is decomposed forming water gas; the carbon dioxid picks up another atom of carbon and forms carbon monoxid; the tarry vapors are largely "cracked" into fixed gases with the release of carbon which unites with the oxygen from the decomposed steam to make carbon monoxid, and the heavy hydro-carbon gases are broken up into simpler and more fixed gases. Any heavy tarry residue which resists cracking will be to a great degree filtered in passing through the coke in the generator $b$, and will be burned off when the latter generator is next put on blast. With the proper control of heat and speed of travel, which may be regulated by the aid of the several gages, the converted gas will be a mixture of hydrogen and carbon monoxid, with some richer hydro-carbon gases and only a very smaller percentage of diluents. Some minutes later the temperature of both generator chambers will be considerably reduced as a result of the heat absorbing reactions which have been occurring therein, and consequently the gases passing downward through the generator chamber $b$ must travel more slowly in order that the desired reactions may be adequately completed. This slower travel will result from a smaller volume of flow. Steam is now cut off from below the generator chamber $a$, and air is admitted thereto through the pipe 49, and the gate valve 39 is opened. Through control of the relative speed of the air blower 48 and of the exhaust fan 65 a maximum pressure is maintained at a point in the lower portion of the retort $a'$ a short distance above the top of generator $a$, so that all the gas and water vapor given off as a result of heat in the retorts continues to flow down through the retort generator B to the gas outlet pipe 61, but as the volume of flow is much less because of the cutting off of the supply of water gas and steam from the generator chamber $a$, the lower temperature in the generator chamber $b$ is in some degree compensated.

As soon as the coke in the generator chamber $a$ has been brought to incandescence by the admission of air thereto, as above described, the direction of the flow of gases is reversed. The admission of air to the generator $a$ is cut off and steam is admitted to the generator $b$ through the pipe 56, so that the water gas and steam pass up through the coke in the generator chamber $b$, through the materials in the retort $b'$, across to the retort $a'$, and down through the incandescent coke in the generator chamber $a$ to the outlet pipe 60. When the heat in the coke body of the generator chamber $b$ is no longer high enough to break up the steam, the steam is shut off from said generator chamber, and blasting is resumed therein, the distilled gases from the retorts in this interval continuing to pass down through the retort generator A.

The relative length of the blasting and steaming periods in each generator will be determined by the composition of the coal or other material used. If coal, high in fixed carbon and low in moisture, is used, a smaller percentage of the fixed carbon will supply the heat required to carry on the process. A larger portion will be available for conversion into carbon monoxid along with the decomposition of steam, and the steaming period will be longer. When high oxygen, high moisture materials, low in the proportion of fixed carbon are used, the moisture and carbon dioxid given off in the retorts will take up all the fixed carbon in excess of that needed to produce heat so that there will be no admission of steam below the grates except for the purpose of purging the generator chambers. One generator or the other will then be on blast at practically any point of time, and a constant supply of heat to the exterior of the retorts will be taking place, thereby providing the extra heat needed to vaporize the moisture in the materials used. By this method of gasification, there is achieved a substantially complete conversion into combustible gas of all the material in the coal except the mineral residue, including the moisture contained in the coal as such, the combined oxygen, and such of the tarry vapors as are non-resistant at the temperatures maintained within the generator. Also there is a minimum of inert diluents, such as nitrogen and carbon dioxid. To secure this freedom from objectionable diluents, the walls of the retorts must be impervious to the passage inward of the blast gases under a considerable differential in pressure, and the heat of the generator fuel and the rate of flow of the gases must be well regulated so as to permit the completion of the desired reactions and to prevent reversal. Assuming a jacketing of the apparatus with heat insulating material and the use of the escaping blast gases to preheat the air supply, the efficiency of gasification will correspond closely to that realized in an efficiently operated double zone producer.

The relatively large volume of gas produced from a given amount of fuel by the use of my improved process, and the relatively small proportion of inert diluents contained in it, are features which are of vital importance, especially in gas plants for small communities, as they can be served by a plant of modest capacity which can be operated entirely by one man and made to produce during a day shift sufficient gas for the supply of the community during twenty-four hours. Also the apparatus can be put out of operation with little stand-by cost for keeping up the heat and be put into operation very quickly on the following day. The self contained character of the apparatus, reducing the loss of heat by conduction and radiation in the passage of the gas through the several steps in the process gives to the apparatus a high net efficiency in converting solid combustibles into gaseous form. The gas made from bituminous coal in a producer will normally contain about 65 per cent. by volume of nitrogen and carbon dioxid and 35 per cent. only of combustible gas. The larger part of the original volatile hydro-carbons have been decomposed by union with oxygen into $H_2O$ and oxids of carbon so that they can be put into no combustible form other than $H_2$ and $CO$. The gas resulting from the method here disclosed should, with careful operation, contain little more than 5 per cent. of inert gases. Hence with the same combustible content, it will have a heat value per cubic foot 2.5 times that of the same volume of producer gas. The calorific value per cubic foot will also be increased by the larger proportion of hydro-carbon gases as $CH_4$. Assuming the heat value of producer gas from bituminous coal to be 150 B. T. U. gross, the heat value of the product under consideration will be 150 B. T. U.×2.5 or 375 B. T. U. This should be increased by its higher percentage of hydro-carbon gases from 10 to 50 B. T. U., making the heat value per cubic foot from 385 B. T. U. to 425 B. T. U. gross. Such a gas contains sufficient value for a given volume and weight to permit of its general distribution, its heat value per cubic foot of combustible mixture being slightly greater than that of a standard gas of 550 to 600 B. T. U.

What I claim as my invention, and desire to secure by Letters Patent, is:—

1. The method of manufacturing gas by the use of two similar retort generators having their retort portions cross-connected, which consists in cyclically operating said retort generators to cause gases in one thereof to flow upward through charges of carbonaceous material therein and then down through charges of carbonaceous material in the other, and afterward reversing the direction of flow of the gases.

2. The method of manufacturing gas by the use of two similar retort generators having their retort portions cross-connected, which consists in cyclically operating said retort generators to cause gases in one thereof to flow upward through charges of carbonaceous material therein and then down through charges of carbonaceous material in the other, and afterward reversing the direction of flow of the gases, and meanwhile alternately operating the generator portions of said retort generators on blast to heat the fuel therein to the requisite temperature.

3. The method of manufacturing gas by the use of two similar retort generators having their retort portions cross-connected, which consists in cyclically operating said retort generators to cause gases in one thereof to flow upward through charges of carbonaceous material therein and then down through charges of carbonaceous material in the other, and afterward reversing the direction of flow of the gases, meanwhile alternately operating the generator portions of said retort generators on blast to heat the fuel therein to the requisite temperature, and using the heat of the blast gases to heat the retort portions of said retort generators.

4. The method of manufacturing gas by the use of two similar retort generators having their retort portions cross-connected, which consists in first blasting in one generator and then passing steam up through the incandescent fuel therein, meanwhile maintaining a downward flow of the resultant gases through the other retort generator.

5. The method of manufacturing gas by the use of two similar retort generators having their retort portions cross-connected, which consists in first blasting in one generator, then passing steam up through the incandescent fuel therein, meanwhile maintaining a downward flow of the resultant gases through the other retort generator, and then reversing the operation of said retort generators.

6. The method of manufacturing gas by the use of two similar retort generators having their retort portions cross-connected, which consists in first blasting in one generator and utilizing the blast gases to heat the retort portions of said retort generators, and then passing steam up through the incandescent fuel in said generator, meanwhile maintaining a downward flow of the resultant gases through the other retort generator.

7. The method of manufacturing gas by the use of two vertical retorts open to each other at the top and disposed above and discharging freely into corresponding gas generators, which comprises the periodic admission of steam successively to the lower part of each of the generators and the passage of the resultant gas through the retorts to a point of withdrawal in the lower part of the other generator, alternated with the periodic blasting of each of the generators, the direction of the blast gases into flues surrounding the retorts concurrently with the withdrawal by suction of the gases given off in the retorts through an outlet in the lower part of the generator not in blast, the maintenance of a maximum pressure within the apparatus at a point in the retort just above the generator in blast, and a periodic reversal in the direction of the flow of gas.

8. The method of gas manufacture by the use of two vertical retort generators cross-connected at the top, comprising the periodic admission of steam to the lower part of each of the generators alternately, the passage of the resultant gas through the retorts to an outlet in the lower portion of the other generator, alternated with the periodic admission of air to the lower portion of each of the generators, the direction of the blast gases into flues surrounding the retorts, the concurrent withdrawal by suction of the gases given off in the retorts through an outlet in the lower portion of the generator not in blast, and the periodic reversal in the direction of the flow of gas.

9. The method of gas manufacture by the use of two vertical retort generators open to each other at the top, comprising the periodic admission of air under pressure to the lower portion of one of the generators, the direction of the blast gases into flues surrounding the retorts, the simultaneous withdrawal of the gases given off in the retorts by suction through an outlet in the lower portion of the generator not in blast, the maintenance of a maximum pressure in the lower portion of the retort above the generator in blast, the periodic alternation in blasting from one to the other generator, and the periodic reversal in the direction of the flow of gas generated in the retorts.

10. The method of manufacturing gas from hydro-carbonaceous solids by the use of two similar retort generators having their retort portions cross-connected, which consists in blasting one of the two generators, directing the blast gases through a closable outlet into heating flues adjacent to the retorts, and simultaneously creating a partial vacuum at a closable outlet in the lower part of the second generator sufficient to draw the gases and vapors distilling off in the retorts through prior heated material in the second generator and through said outlet, alternately blasting the second generator, directing the blast gases through a closable outlet into heating flues adjacent to the retorts, and simultaneously creating a partial vacuum at a closable outlet in the lower part of the first generator sufficient to draw the gases and vapors distilling off in the retorts through the heated material in the first generator and through said outlet.

11. The method of manufacturing gas from hydro-carbonaceous solids by the use of two similar retort generators having their retort portions cross-connected, which comprises blasting one of the two generators, directing the blast gases through a closable outlet into heating flues adjacent to the retorts, and simultaneously creating a partial vacuum at a closable outlet in the lower portion of the second generator sufficient to draw the gases and vapors distilling off in the retorts down through the previously heated material in the second generator and through said outlet, periodically suspending the blasting in the first generator, closing the blast gas outlet in the same, closing the gas outlet in the second generator, opening a closable gas outlet in the lower portion of the first generator and creating a partial vacuum thereat sufficient to draw the gases and vapors distilling off in the retorts down through the heated material in the first generator and through said outlet, simultaneously injecting steam into the lower portion of the second generator, later shutting off the steam and blasting therein, directing the blast gases through a closable outlet into heating flues adjacent to the retorts and periodically reversing the procedure and direction of gas withdrawal.

12. The method of manufacturing gas from hydro-carbonaceous solids by the use of two vertical cross-connected retorts disposed above and discharging freely into corresponding generators, which comprises the blasting of one generator, the direction of the blast gases through a closable outlet into heating flues adjacent to the retorts, the concurrent creation of a partial vacuum at a closable outlet in the lower portion of the second generator sufficient to draw the gases and vapors distilling off in the retorts through the prior heated material in the second generator and through said outlet, the alternate blasting of the second generator, the direction of the blast gases through a closable outlet into heating flues adjacent to the retorts, the concurrent creation of a partial vacuum at a closable outlet in the lower portion of the first generator sufficient to draw the gases and vapors distilling off in the retorts through the heated material in the first generator and through said outlet, and the maintenance of a maximum pressure within the apparatus at a point in the lower portion of the retort above the generator in blast.

WILLIAM D. WILCOX.